(12) United States Patent
Jeon et al.

(10) Patent No.: US 8,828,258 B2
(45) Date of Patent: Sep. 9, 2014

(54) STAINLESS STEEL SEPARATOR FOR FUEL CELL AND THE MANUFACTURING METHOD THEREOF

(75) Inventors: Yoo Taek Jeon, Gyeonggi-do (KR); Yeon Soo Jeong, Gyeonggi-do (KR)

(73) Assignee: Hyundai Hysco, Ulsan (KR)

( * ) Notice: Subject to any disclaimer, the term of this patent is extended or adjusted under 35 U.S.C. 154(b) by 356 days.

(21) Appl. No.: 12/595,754

(22) PCT Filed: Jul. 27, 2007

(86) PCT No.: PCT/KR2007/003624
§ 371 (c)(1),
(2), (4) Date: Oct. 13, 2009

(87) PCT Pub. No.: WO2008/130078
PCT Pub. Date: Oct. 30, 2008

(65) Prior Publication Data
US 2010/0129697 A1 May 27, 2010

(30) Foreign Application Priority Data

Apr. 18, 2007 (KR) .......... 10-2007-0037762

(51) Int. Cl.
| | | |
|---|---|---|
| *C23F 1/00* | (2006.01) | |
| *C23G 1/08* | (2006.01) | |
| *C23F 1/28* | (2006.01) | |
| *C22C 38/00* | (2006.01) | |
| *C22C 38/42* | (2006.01) | |
| *C22C 38/44* | (2006.01) | |
| *C25D 11/34* | (2006.01) | |
| *H01M 8/02* | (2006.01) | |

(52) U.S. Cl.
CPC . *C23G 1/085* (2013.01); *C23F 1/28* (2013.01); *C22C 38/008* (2013.01); *C22C 38/42* (2013.01); *C22C 38/44* (2013.01); *C23G 1/088* (2013.01); *C25D 11/34* (2013.01); *H01M 8/021* (2013.01); *H01M 8/0219* (2013.01); *H01M 8/0228* (2013.01); *Y02E 60/50* (2013.01)
USPC .............. 216/83; 216/96; 216/100; 216/101; 216/108; 252/79.1; 205/684; 205/685

(58) Field of Classification Search
None
See application file for complete search history.

(56) References Cited

U.S. PATENT DOCUMENTS

| | | | | |
|---|---|---|---|---|
| 4,681,814 | A | * | 7/1987 | Leidheiser et al. ........... 428/457 |
| 5,374,338 | A | * | 12/1994 | Boyko et al. .................. 205/666 |
| 6,884,363 | B2 | * | 4/2005 | Ohtani et al. ..................... 216/6 |

(Continued)

FOREIGN PATENT DOCUMENTS

| | | |
|---|---|---|
| JP | 10-158812 | 6/1998 |
| JP | 10-228914 | 8/1998 |
| JP | 11-162478 | 6/1999 |
| JP | 2000-353531 | 12/2000 |
| JP | 2002023654 A | 1/2002 |
| JP | 2002-270196 | 9/2002 |

(Continued)

*Primary Examiner* — Anita Alanko
(74) *Attorney, Agent, or Firm* — Lowe Hauptman & Ham, LLP

(57) ABSTRACT

A method for surface treatment of a stainless steel separator for a fuel cell comprises preparing a stainless steel sheet containing nickel, chrome and iron, and having a passive film on a surface of the stainless steel sheet, and dipping the stainless steel sheet into a mixed etching solution of nitric acid (HNO3) and sulfuric acid (H2SO4) at a temperature of 50-70° C. for 30 seconds to 30 minutes to selectively lower an amount of Fe in the passive film formed on the surface of the stainless steel sheet.

6 Claims, 7 Drawing Sheets

(56) References Cited

U.S. PATENT DOCUMENTS

| | | |
|---|---|---|
| 7,981,570 B2 * | 7/2011 | Takai et al. .................... 429/517 |
| 2001/0018965 A1 * | 9/2001 | Matsukawa et al. ............ 165/58 |
| 2003/0157391 A1 * | 8/2003 | Coleman et al. ................ 429/34 |
| 2003/0170523 A1 * | 9/2003 | Miyano et al. .................. 429/34 |
| 2003/0170526 A1 * | 9/2003 | Hodgson et al. ................ 429/34 |
| 2003/0224236 A1 * | 12/2003 | Morita et al. ................... 429/34 |
| 2005/0241732 A1 * | 11/2005 | Ishigami et al. ............... 148/245 |
| 2005/0267004 A1 * | 12/2005 | Abd Elhamid et al. ....... 510/175 |
| 2006/0105218 A1 * | 5/2006 | Ishikawa et al. ............... 429/34 |
| 2008/0050635 A1 * | 2/2008 | Gao et al. ....................... 429/34 |
| 2009/0269649 A1 * | 10/2009 | Jeon et al. ...................... 429/34 |
| 2010/0044624 A1 * | 2/2010 | Wilken et al. ................. 252/79.1 |
| 2011/0294042 A1 * | 12/2011 | Kim et al. ...................... 429/516 |
| 2013/0316262 A1 * | 11/2013 | Ishii et al. ..................... 429/479 |

FOREIGN PATENT DOCUMENTS

| | | |
|---|---|---|
| JP | 2003132904 A | 5/2003 |
| JP | 2003-272653 | 9/2003 |
| JP | 2003-276249 | 9/2003 |
| JP | 2003-297379 | 10/2003 |
| JP | 2005-089800 | 4/2005 |
| JP | 2008091225 A | 4/2008 |
| KR | 10-0689757 | 2/2007 |
| WO | WO 99/19927 | 4/1999 |
| WO | WO 02/23654 A1 | 3/2002 |
| WO | WO 2005/124913 A1 | 12/2005 |
| WO | WO 2007014967 A1 * | 2/2007 |

* cited by examiner

STAINLESS STEEL SEPARATOR FOR FUEL CELL AND THE MANUFACTURING METHOD THEREOF

RELATED APPLICATIONS

This application is the U.S. National Phase under 35 U.S.C. §371 of International Application No. PCT/KR2007/003624, filed on Jul. 27, 2007, which in turn claims the benefit of Korean Patent Application No. 10-2007-0037762, filed on Apr. 18, 2007, the disclosures of which Applications are incorporated by reference herein.

TECHNICAL FIELD

The present invention relates to a stainless steel separator for a fuel cell and a method for surface treatment thereof. More particularly, the present invention relates to a stainless steel separator for a fuel cell, which is subjected to surface treatment for improvement of electrical conductivity and corrosion resistance, and to a method for surface treatment thereof.

BACKGROUND ART

A fuel cell is an electrochemical energy conversion device that generally converts chemical energy into electric energy through oxidation and reduction of hydrogen and oxygen.

At an anode, oxidation occurs to split hydrogen into hydrogen ions and electrons. The hydrogen ions are moved to a cathode through an electrolyte, and the electrons are moved to the cathode through a circuit. At the cathode, reduction occurs to combine the hydrogen ions and the electrons with oxygen to produce water.

Since it is impractical to use only a single unit cell of the fuel cell due to its low voltage, a stack of several to several hundred unit cells is generally used in practice. Here, a separator is provided to ensure electrical connection between unit cells while separating a reaction gas in the stack of unit cells.

In past times, graphite-based separators were generally used. Recently, however, metal separators have been actively developed to overcome problems of the graphite-based separators such as high brittleness of graphite and high manufacturing costs.

The separator is required to have a sufficiently high electrical conductivity for ensuring electric connection between the respective unit cells. Further, since the interior of the fuel cell has a high concentration of hydrogen ions, high temperature, and a highly corrosive environment, it is also necessary for the separator to have a sufficiently high corrosion resistance.

To ensure the electrical conductivity and corrosion resistance of the separator, Japanese Patent Application Publication Nos. H11-162478 and H10-228914 disclose techniques of plating a noble metal such as gold on the surface of a metal separator.

Irrespective of improvement in corrosion resistance and electrical conductivity, such techniques as described above suffer from high manufacturing costs and generation of defects such as pin holes, which leads to low practicability.

Japanese Patent Application Publication Nos. 2003-276249 and 2003-272653 disclose techniques of plating a very thin film of gold on a metal separator for cost reduction. However, these techniques have problems in that there is a high possibility of corrosion related to pin holes caused by hydrogen generated during the gold coating, and that although gold is thinly coated thereon, it is still expensive compared to other wet coating.

PCT WO99/19927 discloses a technique in which relatively inexpensive carbon powder is dispersed on the surface of a metal separator, and spreads into a passive film of the separator through rolling and heat treatment to improve the electrical conductivity.

However, carbon spread into the passive film couples with chrome existing in a large amount in the passive film to precipitate chrome carbide, thereby reducing the content of chrome. As a result, the corrosion resistance on the surface of the material is deteriorated, providing an adverse influence on performance of the fuel cell.

Further, when such a fuel cell is applied to vehicles, the carbon powder is likely to be detached from the separator due to vibration during operation, and since stainless steel exhibits high contact resistance in the case of no proper pretreatment, it is not suitable to be used as a raw material for the metal separator.

Japanese Patent Application Publication No. 2000-353531 discloses a method that forms a titanium nitride film on the surface of the separator through high temperature nitridation of titanium. PCT WO2005/124913 A1 discloses a method, by which a thin Ti plate is formed with gas and coolant paths by pressing, and is subjected to sputtering and plasma nitriding treatment in a reducing gas atmosphere to form a nitrogen diffusion layer on the surface of the separator. However these prior techniques have difficulty with commercialization due to low productivity resulting from use of expensive Ti material and the vacuum process.

FIG. 1 is a view illustrating variation of an atomic ratio as a function of depth from the surface of a conventional stainless steel sheet that is commercially available.

The stainless steel sheet has a passive film that is formed from the surface of the stainless steel sheet to a depth of about 1.5 nm in an internal direction and contains great amounts of iron (Fe) and oxygen (O).

The passive film contains metallic components such as iron, nickel, chrome, etc., which will couple with oxygen in an outer environment to form an oxide film on the passive film.

As such, since iron oxides such as FeO, $Fe_2O_3$, and $Fe_3O_4$ formed on the surface of the stainless steel sheet by coupling of Fe and O cannot suppress corrosion of the separator in a sulfuric acid atmosphere at a high temperature of 80° C. and act as an insulator, the iron oxides lower the electrical conductivity of the separator, thereby causing deterioration in performance of the fuel cell.

DISCLOSURE

Technical Problem

It is an aspect of the present invention to provide a stainless steel separator for a fuel cell and a method for surface treatment thereof, which can provide a passive film that is increased in atomic ratio of chrome through surface modification of the stainless steel sheet to selectively dissolve Fe, which exists in a large amount in the passive film.

It is another aspect of the present invention to provide a stainless steel separator for a fuel cell and a method for surface treatment thereof, which can improve electrical conductivity and corrosion resistance of the passive film simply by etching the stainless steel sheet.

It is a further aspect of the present invention to provide a stainless steel separator for a fuel cell and a method for surface treatment thereof, which ensures a reduced elution of metal ions so as not to deteriorate performance of the fuel cell even after long term operation of the fuel cell.

It is yet another aspect of the present invention to provide a stainless steel separator having improved electrical conductivity, corrosion resistance and durability, and a fuel cell using the same.

Technical Solution

To this end, a first aspect of the present invention provides a method for surface treatment of a stainless steel separator for a fuel cell, comprising: preparing a stainless steel sheet containing nickel, chrome and iron, and having a passive film on a surface of the stainless steel sheet; and dipping the stainless steel sheet into a mixed etching solution of nitric acid ($HNO_3$) and sulfuric acid ($H_2SO_4$) at a temperature of 50~70° C. for 30 seconds to 30 minutes to selectively lower an amount of Fe in the passive film formed on the surface of the stainless steel sheet.

A second aspect of the present invention provides a method for surface treatment of a stainless steel separator for a fuel cell, comprising: preparing a stainless steel sheet containing nickel, chrome and iron, and having a passive film on a surface of the stainless steel sheet; and dipping the stainless steel sheet into an etching solution formed by mixing one of oxalic acid ($C_2H_2O_4$) and hydrogen peroxide ($H_2O_2$) with a solution of nitric acid ($HNO_3$) and sulfuric acid ($H_2SO_4$) prepared as a basic solution to selectively lower an amount of Fe in the passive film formed on the surface of the stainless steel sheet.

A third aspect of the present invention provides a method for surface treatment of a stainless steel separator for a fuel cell, comprising: preparing a stainless steel sheet containing nickel, chrome and iron, and having a passive film on a surface of the stainless steel sheet; and dipping the stainless steel sheet into an etching solution containing sulfuric acid ($H_2SO_4$), followed by applying a potential of 0~0.4 V or 0.8~1.0 V (SHE), to selectively lower an amount of Fe in the passive film formed on the surface of the stainless steel sheet.

Advantageous Effects

According to the present invention, the stainless steel separator can be improved in corrosion resistance and electrical conductivity by dipping a commercial stainless steel sheet into an acid aqueous solution for etching, thereby enabling reduction in manufacturing time and cost, and may have a passive film, of which components can be controlled simply by adjusting a mixing ratio of the solution and a dipping time, thereby enabling easy quality control of the separator.

Further, according to the invention, since the method for surface treatment of the stainless steel separator is performed in such a fashion of stamping a stainless steel sheet, degreasing the stamped stainless steel sheet, and dipping the degreased stainless steel sheet into an acid aqueous solution to achieve desired properties for the stainless steel separator for fuel cells, the stainless steel separator can be produced in a reduced manufacturing period by a continuous process, and since the stainless steel separator can be made of an existing commercial stainless steel sheet, it is easy to secure materials for the stainless steel separator.

Further, according to the invention, the method for surface treatment of the stainless steel separator uses an alkali solution for degreasing the stainless steel sheet so that the acid solution used for etching can be neutralized by mixing with the alkali solution used for degreasing, allowing easy treatment of waste solution.

Further, according to the invention, the method for surface treatment of the stainless steel separator ensures that elution of metal ions from the stainless steel separator is suppressed as much as possible during operation of the fuel cell, which suppresses contamination of an electrolyte thin membrane and thereby ensures an excellent long-term performance of the fuel cell.

Further, according to the present invention, the method for surface treatment of the stainless steel separator for the fuel cell ensures the stainless steel separator can fulfill the requirement for physical properties simply with the etching process without a commercial coating process, thereby enabling reduction in manufacturing cost and time.

MODE FOR INVENTION

According to the present invention, a stainless steel sheet comprises 0.08 wt % carbon (C), 16~28 wt % chrome (Cr), 0.1~20 wt % nickel (Ni), 0.1~6 wt % molybdenum (Mo), 0.1~5 wt % tungsten (W), 0.1~2 wt % tin (Sn), 0.1~2 wt % copper, and the balance of iron (Fe) and other unavoidable impurities.

The stainless steel sheet is dipped into an etching solution for 30 seconds~10 minutes to reduce processing time.

The stainless steel sheet has a passive film, of which Fe content is decreased by an operation of reducing the content of Fe in the passive film. Here, the passive film comprises 20~75 wt % chrome (Cr) and 30 wt % or less iron (Fe) while satisfying a condition of $(Cr+Ni)/Fe \geq 1$ in terms of atomic weight.

Hereinafter, embodiments of the present invention will be described in detail with reference to the accompanying drawings.

Figure 1:
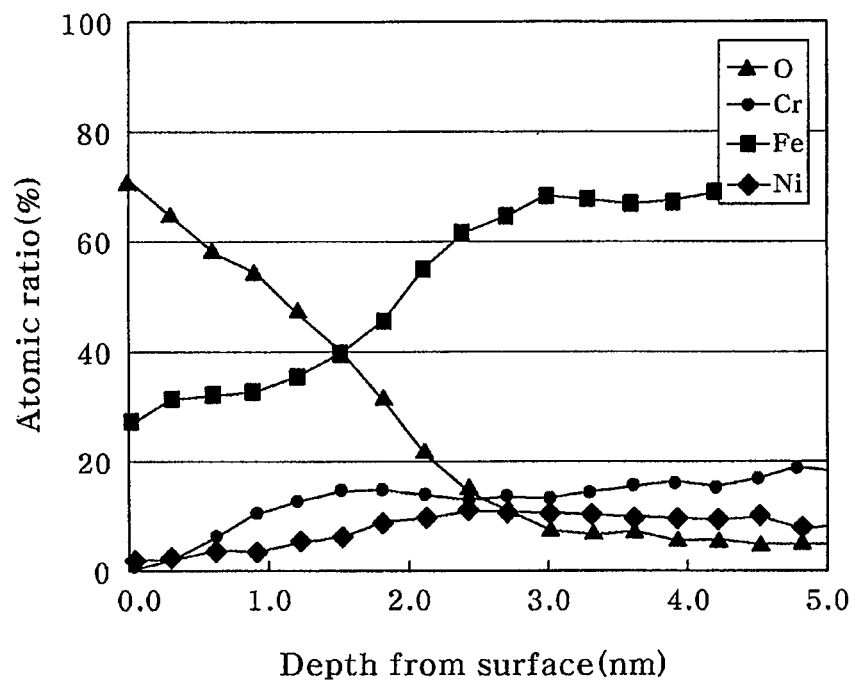
FIG. 1 is a graph representing variation of an atomic ratio as a function of depth from a surface of a conventional stainless steel sheet commercially available.
Figure 2:
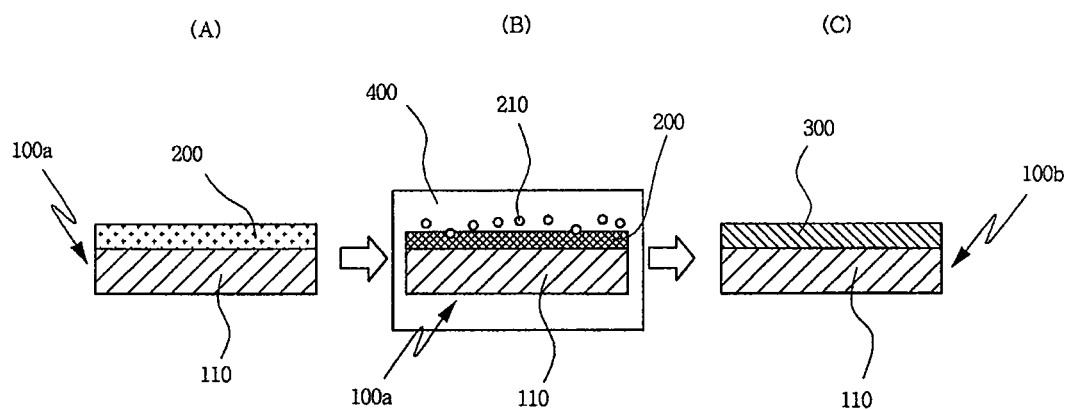
FIG. 2 is a diagram schematically illustrating a process of manufacturing a stainless steel separator for a fuel cell with an etching solution according to the present invention.

FIG. 2 is a diagram schematically illustrating a process of manufacturing a stainless steel separator for a fuel cell with an etching solution according to the present invention.

Referring to FIG. 2, after preparing a stainless steel sheet 110, it is processed to provide a stainless steel separator 100a having a coat film 200 that is formed on the surface of the stainless steel sheet 110 and has a thickness of about 1.5 nm (Operation A).

The stainless steel sheet comprises 0.08 wt % carbon (C), 16~28 wt % chrome (Cr), 0.1~20 wt % nickel (Ni), 0.1~6 wt % molybdenum (Mo), 0.1~5 wt % tungsten (W), 0.1~2 wt % tin (Sn), 0.1~2 wt % copper, and the balance of iron (Fe) and other unavoidable impurities.

The coat film 200 formed on the stainless steel sheet 110 is provided through oxidation of various components including iron, nickel, chrome, etc.

Then, the separator 100a is dipped into an etching solution 400 (Operation B). The etching solution serves to selectively dissolve iron (Fe) among metallic components contained in the coat film 200.

After performing Operation B, the separator 100a is taken out from the etching solution 400 (Operation C). Here, the coat film 200 can be etched to a thickness of about 1.0 nm by the etching solution 400.

In this manner, the stainless steel separator 100b for the fuel cell may have a passive film 300, of which thickness is reduced by decreasing the thickness of the coat film 200 with the etching solution 400.

Therefore, it is necessary for the stainless steel separator 100b of the fuel cell to have high electrical conductivity so as to allow current flow for operation in a fuel cell environment in which an electrolyte, hydrogen and oxygen exist at a high temperature exceeding room temperature. In this regard, the passive film 300 containing chrome (Cr) and nickel (Ni) and having a decreased thickness simply by the etching can provide the stainless steel separator 100b for the fuel cell, which has an improved electrical conductivity.

In other words, as chrome (Cr) and nickel (Ni) are concentrated in the passive film 300 with a decrease in thickness of the oxide coating after etching, the electrical conductivity and corrosion resistance of the stainless steel separator 100b for the fuel cell can be improved.

In the mean time, the coat film 200 formed on the stainless steel sheet 110 comprises $Fe_2O_3$, $Fe_3O_4$, $Cr_2O_3$, and $Ni_2O_3$.

Although the corrosion resistance of the stainless steel sheet 110 is fulfilled by such a coat film 200, the electrical conductivity can be deteriorated due to a high thickness of the coat film and a great amount of oxides therein.

Therefore, it is preferable that $Fe_2O_3$ of the coat film 200 is selectively lowered in amount through chemical etching or electrochemical etching when forming the passive film 300.

In this regard, since iron (Fe) has a low corrosion potential and tends to be dissolved in acid, whereas chrome (Cr) has a high corrosion potential and is not likely to be dissolved in acid, it is possible to perform selective etching.

Since chrome oxide ($Cr_2O_3$) has a good corrosion resistance, it is possible to allow an abundant amount of chrome (Cr) to remain on the surface of the stainless steel sheet 110 in such a fashion of selectively etching and lowering iron oxide ($Fe_2O_3$).

Although nickel (Ni) has a somewhat lower corrosion resistance than chrome (Cr), it has a high electrical conductivity and contributes to improvement in physical properties of the stainless steel separator 100b for the fuel cell.

As a result, dissolution of iron (Fe) contained in the passive film 300 leads to an increase in weight ratio of chrome (Cr) and nickel (Ni) in the passive film 300 after the etching.

The passive film 300 formed by etching the coat film 200 on the stainless steel sheet comprises 20~75 wt % chrome (Cr) and 30 wt % or less iron (Fe) while satisfying a condition of (Cr+Ni)/Fe≥1 in terms of atomic weight.

The stainless steel separator 100b of the fuel cell is required to have a high corrosion resistance for operation in a fuel cell environment in which an electrolyte, hydrogen and oxygen exist at a high temperature exceeding room temperature. In this regard, the passive film 300 with chrome (Cr) and nickel (Ni) increased in weight ratio simply by the etching can ensure the stainless steel separator 100b for the fuel cell has an improved corrosion resistance.

Figure 3:
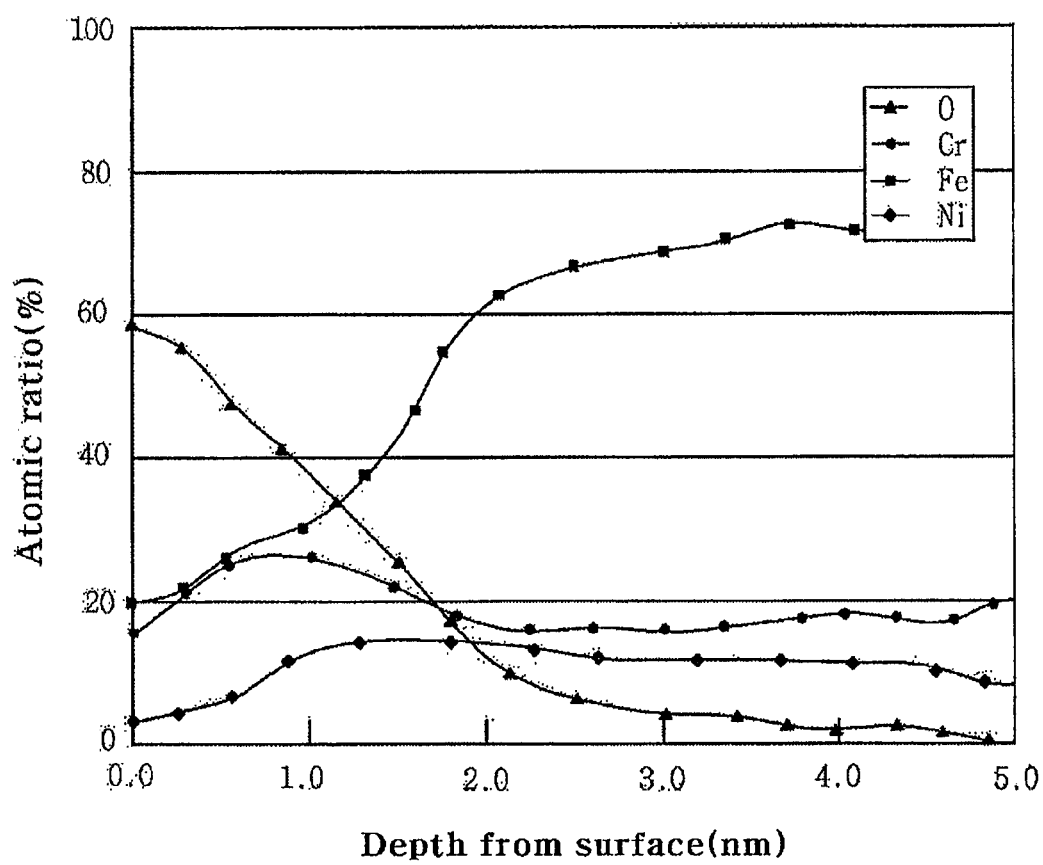
FIG. 3 is a graphical representation of components in terms of atomic ratio as a function of depth from a surface of a stainless steel sheet according to the present invention.

FIG. 3 is a graphical representation of components in terms of atomic ratio as a function of depth from the surface of the stainless steel sheet according to the present invention.

The coat film formed on the stainless steel sheet can be etched using a mixed solution of nitric acid ($HNO_3$) and sulfuric acid ($H_2SO_4$) prepared as a first etching solution according to the present invention. In the first etching solution, nitric acid ($HNO_3$) may serve to form the passive film, and sulfuric acid ($H_2SO_4$) may serve to selectively dissolve iron (Fe) in the coat film.

The first etching solution comprises 5~20 wt % pure nitric acid ($HNO_3$), 2~15 wt % pure sulfuric acid ($H_2SO_4$), and the balance of water. Etching with the first etching solution may be suitably performed at a temperature of 50~70° C. for 30 seconds to 30 minutes, and preferably for 30 seconds to 10 minutes or less while controlling the concentration of nitric acid and sulfuric acid in the solution, in consideration of productivity relating to the processing time.

A second etching solution according to the present invention can be formed by mixing one or both of oxalic acid ($C_2H_2O_4$) and hydrogen peroxide ($H_2O_2$) with the first etching solution (nitric acid+sulfuric acid), and serves to accelerate an etching rate on the surface of the stainless steel sheet.

The second etching solution may comprise 5~20 wt % pure nitric acid ($HNO_3$), 2~15 wt % pure sulfuric acid ($H_2SO_4$), 0.5~10 wt % pure oxalic acid ($C_2H_2O_4$), and the balance of water.

Alternatively, the second etching solution may comprise 5~20 wt % pure nitric acid ($HNO_3$), 2~15 wt % pure sulfuric acid ($H_2SO_4$), 0.5~10 wt % pure hydrogen peroxide ($H_2O_2$), and the balance of water.

Etching with the second etching solution may be suitably performed at a temperature of 50~70° C. for 30 seconds to 30 minutes, and preferably for 30 seconds to 10 minutes or less while controlling the concentration of nitric acid and sulfuric acid in the solution, in consideration of productivity relating to the processing time.

Each of stainless steel sheets with compositions as shown in FIG. 3 was etched using the second etching solution composed of 10% nitric acid, 5% sulfuric acid, and 5% oxalic acid for 3 minutes at 60° C.

As the temperature of the etching solution and the dipping time increase, reaction is activated to allow the etching solution to exhibit the similar effects to those obtained by increasing the amount of sulfuric acid or nitric acid.

However, as the reaction time between the etching solution and the stainless steel sheet is further extended, the productivity of the stainless steel sheet for the fuel cell can decrease along with an increase in manufacturing costs.

In this regard, etching with the etching solution as described above may be suitably performed at a temperature of 50~70° C. for 30 seconds to 30 minutes, and preferably for 30 seconds to 10 minutes or less while controlling the concentration of nitric acid and sulfuric acid in the etching solution, in consideration of the productivity relating to the processing time.

By the etching process with the aforementioned etching solution, the thickness of the passive film on the surface of the stainless steel sheet can be reduced to about 1.0 nm. Further, it can be found that the atomic ratios of chrome (Cr) and nickel (Ni) increase in the passive film.

Here, the passive film may comprise 30 wt % or less iron and 20~75 wt % chrome.

In this manner, the corrosion resistance of the stainless steel sheet can be improved by increasing the weight ratios of Cr and Ni in such a fashion of selectively lowering the amount of Fe in the passive film using the etching solution comprising sulfuric acid ($H_2SO_4$), nitric acid ($HNO_3$), etc., and the electrical conductivity thereof can be improved by increasing the content ratios of chrome and nickel.

Therefore, as the content ratios of chrome (Cr) and nickel (Ni) exhibiting excellent electrical conductivity and corrosion resistance compared to iron (Fe) increase, the electrical conductivity and corrosion resistance of the passive film can be improved.

Further, when applying the stainless steel separator of the invention to a fuel cell, the fuel cell may have improved durability, stability, and reliability.

Figure 4:
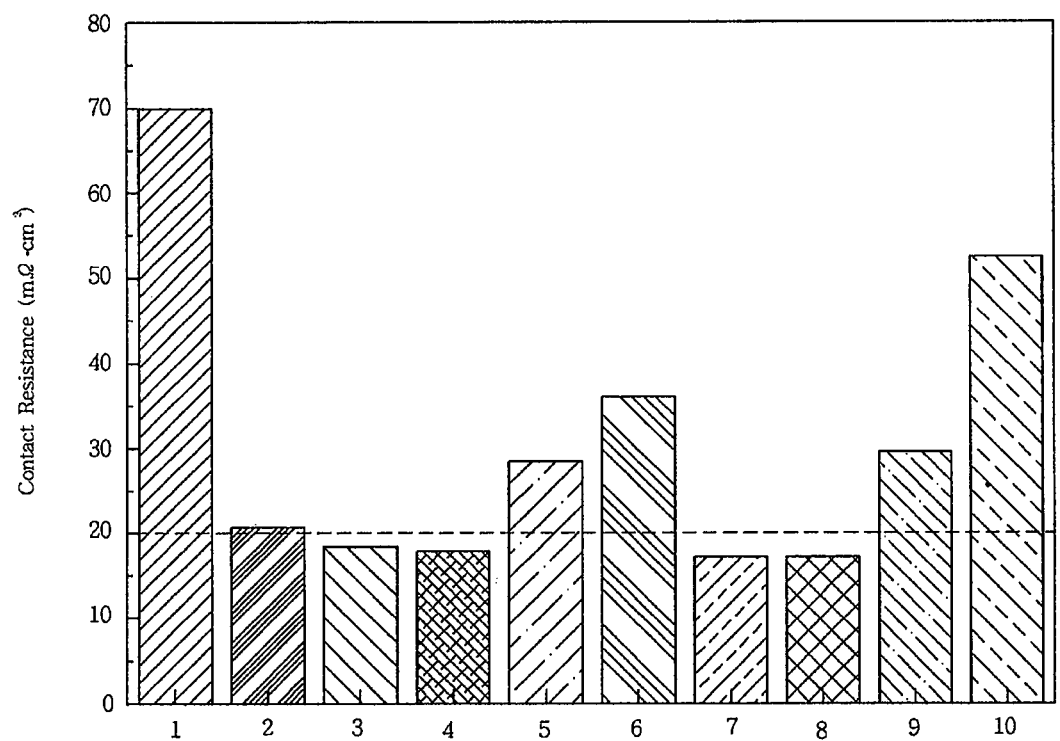
FIG. 4 is a graph depicting contact resistance of the stainless steel sheet etched using an etching solution according to the present invention.

FIG. 4 is a graph depicting contact resistance of the stainless steel sheet etched using the etching solution according to the present invention. Here, FIG. 4 shows the contact resistance of the stainless steel sheet depending on a dipping time of the stainless steel sheet and a variety of etching conditions. Table 1 shows samples on the X-axis of FIG. 4.

The stainless steel separator for the fuel cell preferably has a contact resistance of 20 m$\Omega$·cm$^2$ or less. Referring to Table 1 below, conditions satisfying physical properties in view of contact resistance for a desired stainless steel separator for a fuel cell are Nos. 2, 3, 4, 7, and 8.

From Table 1 below, it can be understood that the second etching solution obtained by mixing one of oxalic acid and hydrogen peroxide ($H_2O_2$) with the first etching solution of $HNO_3+H_2SO_4$ is suitable as an etching solution for forming the desired stainless steel separator for the fuel cell.

TABLE 1

| No. | Conditions |
|---|---|
| 1 | STS316L plate |
| 2 | $HNO_3 + H_2SO_4$, 30 seconds, 60° C. |
| 3 | $HNO_3 + H_2SO_4$, 3 minutes, 60° C. |
| 4 | $HNO_3 + H_2SO_4$, 10 minutes, 60° C. |
| 5 | $HNO_3$ + HCl + Picric, 3 minutes |
| 6 | Oxalic acid + $H_2O_2$, 3 minutes, 60° C. |
| 7 | $HNO_3 + H_2SO_4$ + Oxalic acid, 3 minutes, 60° C. |
| 8 | $HNO_3 + H_2SO_4 + H_2O_2$, 3 minutes, 60° C. |
| 9 | $HNO_3 + H_2SO_4$ + Oxalic acid + $H_2O_2$, 3 minutes, 60° C. |
| 10 | NaOH, 3 minutes, 60° C. |

Referring to FIG. 4, when comparing Nos. 2~5 with one another, it can be seen that although an increase in etching time from 30 seconds to 10 minutes results in a decrease in contact resistance, a decreasing degree of the contact resistance is somewhat reduced as the etching time increases. Therefore, it is desirable to simplify the manufacturing process by shortening the processing time through selection of a suitable etching time under the conditions that fulfill the required electrical conductivity and corrosion resistance.

Further, when comparing Nos. 3, 7, and 8 with one another, it can be seen that the contact resistance of Nos. 7 and 8 is further lowered even with the same etching time. It is believed that oxalic acid or hydrogen peroxide ($H_2O_2$) added to the etching solution enhances reactivity of sulfuric acid ($H_2SO_4$) and nitric acid ($HNO_3$) with iron (Fe), thereby improving the etching rate and etching effect with respect to the stainless steel sheet.

As such, according to the present invention, since it is possible to easily adjust the conductivity and corrosion resistance of the stainless steel separator for the fuel cell through adjustment in concentration of the etching solution and in dipping time, desired physical properties of the stainless steel separator for the fuel cell can be easily achieved. Further, according to the present invention, it is possible to omit a coating process in surface treatment of the stainless steel separator for the fuel cell, and to reduce manufacturing costs and time for the stainless steel separator for the fuel cell by using commercial stainless steel.

Additionally, in accordance with another embodiment of the present invention, the passive film of the stainless steel sheet may be etched to improve the conductivity and corrosion resistance by electrochemical etching performed in such a way of dipping the stainless steel sheet in a sulfuric acid solution ($H_2SO_4$) and then applying potential thereto.

Figure 5:
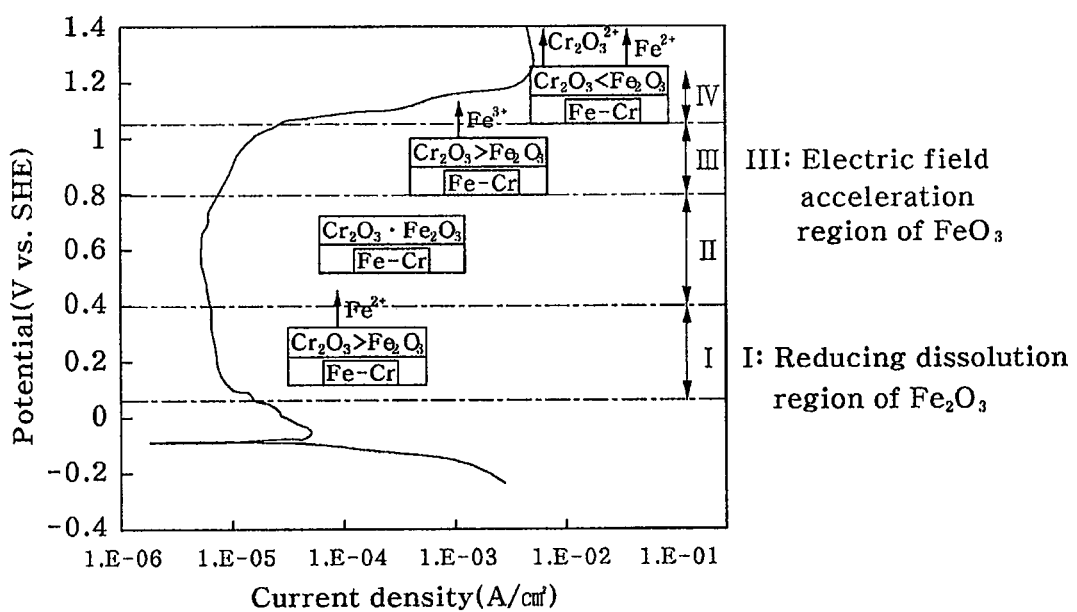
FIG. 5 is a graph schematically representing electrochemically etched regions of the stainless steel sheet according to the present invention.

FIG. 5 is a graph schematically representing electrochemically etched regions of the stainless steel sheet according to the present invention. In FIG. 5, a content ratio and a dissolving component of each passive film are shown as a function of applied potential. Here, 0.1N (N is normality) sulfuric acid solution ($H_2SO_4$) was used.

Referring to FIG. 5, I region indicates a region where $Fe_2O_3$ of the passive film is reduced and dissolved, and II region indicates a region where both $Fe_2O_3$ and $Cr_2O_3$ are not substantially dissolved.

III region indicates a region where $Fe_2O_3$ is rapidly dissolved, and IV region indicates a transpassive region where $Cr_2O_3$, a main component of the passive film, begins to be dissolved.

In an oxide film formed at −0.05 V, that is, an initial stage where an anodic oxide film begins to be formed on the surface of the stainless steel sheet, iron (Fe) begins to be oxidized to FeO and γ-FeOOH, and chrome (Cr) begins to be oxidized to $CrO_2$ and $Cr(OH)_3.4H_2O$.

At 0.4 V where formation of a passive film is substantially completed, iron (Fe) is converted to α-FeOOH and γ-FeOOH, and chrome (Cr) is converted to $CrO_2$ and $Cr_3O_3$.

For iron (Fe), compounds with —OH group such as α-FeOOH and γ-FeOOH are stable, and for chrome (Cr), compounds such as $CrO_2$ and $Cr_3O_3$ with bound water detached therefrom are stable. The corrosion resistance of the stainless steel sheet is attributed to stability of the compounds such as α-FeOOH, γ-FeOOH, $CrO_2$, and $Cr_3O_3$.

In the figure showing the stainless steel sheet electrochemically etched by applying a potential of 0~0.4 V or 0.8~1.0 V to the sulfuric acid solution ($H_2SO_4$), selective dissolution of iron (Fe) occurs suitably in I region, and formation of the passive film is substantially completed in II region. Further, dissolution of Fe and Cr occurs simultaneously in IV region, where the dissolution of Fe and Cr can occur excessively in some cases, causing a decrease in electrical conductivity and corrosion resistance.

As such, the electrical conductivity and corrosion resistance of the stainless steel sheet can be adjusted by selectively dissolving a desired component in the passive film of the stainless steel sheet only through adjustment of the potential and concentration of the solution.

Thus, it is preferable to etch the stainless steel sheet by applying a potential of 0~0.4 V or 0.8~1.0 V to the sulfuric acid solution ($H_2SO_4$).

Figure 6:
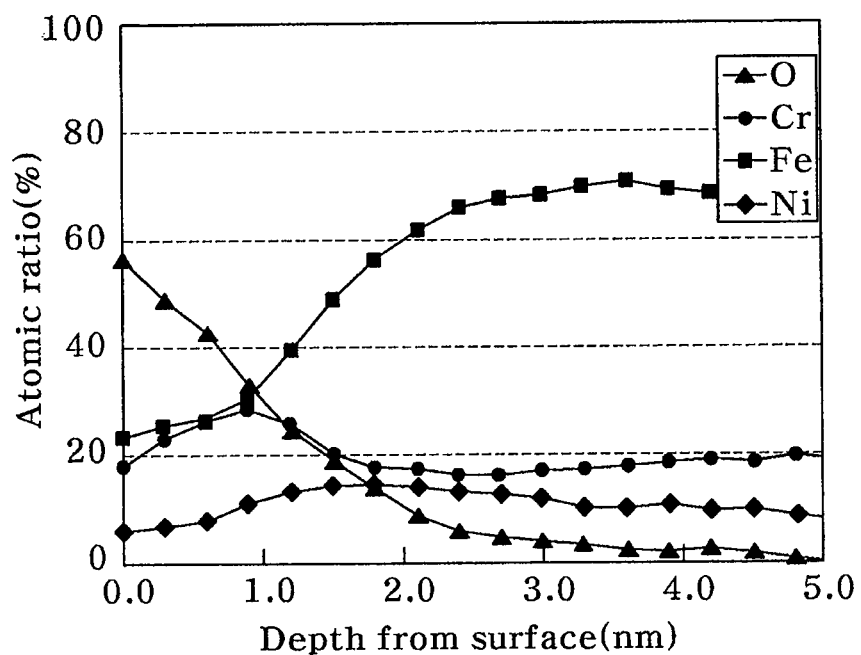
FIG. 6 is a graph representing variation of an atomic ratio as a function of depth from the surface of the stainless steel sheet subjected to electrochemical etching according to the present invention.

FIG. 6 is a graph representing variation of an atomic ratio as a function of depth from the surface of the stainless steel sheet subjected to electrochemical etching according to the present invention.

Here, the stainless steel sheet was subjected to the electrochemical etching for 3 minutes in 60° C. 0.1N $H_2SO_4$ as an etching solution, to which a potential of 0.2 V vs SHE was applied, and an atomic ratio was measured as a function of depth from the surface of the stainless steel sheet.

Referring to FIG. 6, when compared to the atomic ratio of a non-etched passive film depending on the depth from the surface of the stainless steel sheet, it can be found that the etched passive film has increased atomic ratios of Cr and Ni along with a reduced thickness of about 1.0 nm.

Therefore, it can be expected to have improved electrical conductivity and corrosion resistance due to reduction in contents of oxygen (O) and iron (Fe).

Further, with the method of manufacturing the stainless steel separator for the fuel cell according to the present invention, the stainless steel sheet may be formed with a path, by stamping, through which hydrogen, oxygen, coolant water, etc. can pass.

Additionally, after degreasing the stamped stainless steel sheet with an alkali solution, the stainless steel sheet may be subjected to etching to concentrate Cr and Ni in the passive film, thereby improving the electrical conductivity and corrosion resistance of the stainless steel sheet. Thus, according to one embodiment of the invention, the surface of the stainless steel sheet for the fuel cell may be subjected to etching for surface treatment before or after stamping.

In this manner, improvement in electrical conductivity and corrosion resistance of the stainless steel separator can be simply achieved by dipping the stainless steel sheet into the etching solution or by applying potential to the etching solution in which the stainless steel sheet is dipped.

As a result, it is possible to shorten the manufacturing time of the stainless steel separator for the fuel cell and to perform stamping, degreasing, and etching in a continuous manner, thereby reducing the manufacturing cost of the stainless steel separator for the fuel cell.

Further, when using the alkali solution for degreasing, treatment of waste solution can be performed in such a fashion of mixing the alkali solution with the etching solution to neutralize the alkali solution used for degreasing. Therefore, the treatment of waste solution can be achieved easily.

Figure 7:
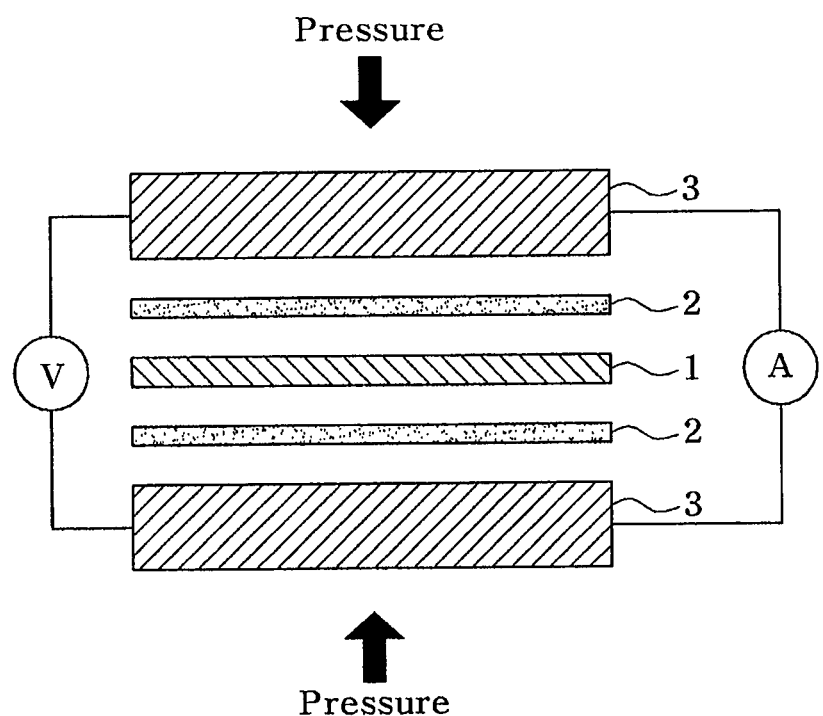
FIG. 7 is a view illustrating a tester for measuring contact resistance of a stainless steel sheet that has a passive film etched by a method for manufacturing a stainless steel separator for a fuel cell according to the present invention.

FIG. 7 is a view illustrating a tester for measuring contact resistance of a stainless steel sheet that has a passive film etched by the method for manufacturing the stainless steel separator for the fuel cell according to the present invention.

Referring to FIG. 7, two pieces of carbon paper 2 are brought into contact with opposite sides of a stainless steel sheet 1, and copper plates 3 are disposed outside the respective pieces of carbon paper 2 while being connected to a circuit comprising a voltage meter V, a current tester A, and a power supplier (not shown).

A pressure of 50~150 $N/cm^2$ and a current of 5 A are applied to the copper plate 3. Preferably, the stainless steel sheet has a contact resistance of 20 $m\Omega \cdot cm^2$ or less.

To measure corrosion current of the stainless steel sheet, the stainless steel sheet is dipped in 0.1N $H_2SO_4$+5 ppm HF solution at 80° C. for 1 hour, and is subjected to $N_2$ bubbling. For comparison, the corrosion current is measured by applying a potential of 0.6V vs SCE (saturated calomel reference electrode), of which environment is similar to a cathode environment of PEFC (polymer electrolyte fuel cell). The stainless steel sheet preferably has a corrosion current of 1 $\mu A/cm^2$ or less.

Table 2 shows physical properties of inventive examples and comparative examples obtained by tests for measuring the physical properties of the stainless steel separator for the fuel cell as described above.

TABLE 2

| | 1) Treatment method | 2) Composition of solution | 3) Temp. (° C.) | 4) Time | Property Evaluation 5) CR ($m\Omega \cdot cm^2$) | 6) CC ($\mu A/cm^2$) | Passive film 7) (Cr + Ni)/Fe |
|---|---|---|---|---|---|---|---|
| IE1 | Dipping | 10% $HNO_3$ + 5% $H_2SO_4$ | 60 | 30 sec. | 18.3 | 0.87 | 1.05 |
| IE2 | Dipping | 10% $HNO_3$ + 5% $H_2SO_4$ | 60 | 3 min. | 16.2 | 0.65 | 1.14 |
| IE3 | Dipping | 10% $HNO_3$ + 5% $H_2SO_4$ | 60 | 3 min. | 14.6 | 0.54 | 1.29 |
| IE4 | Dipping | 10% $HNO_3$ + 5% $H_2SO_4$ | 55 | 10 min. | 13.9 | 0.52 | 1.50 |
| IE5 | Dipping | 10% $HNO_3$ + 5% $H_2SO_4$ + 5% Oxalic acid | 65 | 3 min. | 17.1 | 0.79 | 1.16 |
| IE6 | Dipping | 10% $HNO_3$ + 5% $H_2SO_4$ + 5% Oxalic acid | 60 | 3 min. | 15.5 | 0.55 | 1.27 |
| IE7 | Dipping | 10% $HNO_3$ + 5% $H_2SO_4$ | 60 | 7 min. | 15.3 | 0.77 | 1.28 |
| IE8 | Dipping | 10% $HNO_3$ + 5% $H_2SO_4$ + 5% Oxalic acid | 60 | 1 min. | 18.6 | 0.89 | 1.24 |
| IE9 | Dipping | $HNO_3$ + $H_2SO_4$ + $H_2O_2$ | 60 | 3 min. | 17.3 | 0.76 | 1.22 |
| IE10 | EC Etching | 0.1N $H_2SO_4$(0.2 V vs SHE) | 25 | 30 sec. | 19.1 | 0.88 | 1.35 |
| IE11 | EC Etching | 0.1N $H_2SO_4$(0.9 V vs SHE) | 25 | 30 sec. | 17.2 | 0.75 | 1.52 |
| SUS 316L | | | | | 69.5 | 4.11 | 0.39 |
| CE1 | Dipping | 10% $HNO_3$ + 5% $H_2SO_4$ | 60 | 30 sec. | 23.4 | 2.21 | 0.81 |
| CE2 | Dipping | 10% $HNO_3$ + 5% $H_2SO_4$ + 5% Oxalic acid | 60 | 30 sec. | 21.5 | 1.95 | 1.11 |
| CE3 | Dipping | $HNO_3$ + $H_2SO_4$ + Picric acid | 60 | 3 min. | 26.4 | 1.56 | 0.90 |
| CE4 | Dipping | $HNO_3$ + $H_2SO_4$ + Oxalic acid + $H_2O_2$ | 60 | 3 min. | 25.3 | 2.35 | 0.65 |
| CE5 | Dipping | Oxalic acid + $H_2O_2$ | 60 | 3 min. | 54.3 | 3.86 | 0.47 |
| CE6 | EC Etching | 0.1N $H_2SO_4$(0.6 V vs SHE) | 25 | 30 sec. | 22.1 | 3.51 | 0.82 |
| CE7 | EC Etching | 0.1N $H_2SO_4$(1.2 V vs SHE) | 25 | 30 sec. | 25.6 | 4.48 | 0.75 |
| IE12 | Dipping | 15% $HNO_3$ + 10% $H_2SO_4$ | 60 | 3 min. | 17.3 | 0.87 | 1.25 |

TABLE 2-continued

| | Processing conditions | | | | Property Evaluation 5) | | Passive film |
|---|---|---|---|---|---|---|---|
| | 1) Treatment method | 2) Composition of solution | 3) Temp. (°C.) | 4) Time | CR (mΩ·cm$^2$) | 6) CC (μA/cm$^2$) | 7) (Cr + Ni)/Fe |
| IE13 | Dipping | 7% $HNO_3$ + 5% $H_2SO_4$ | 60 | 3 min. | 19.2 | 0.96 | 1.04 |
| IE14 | Dipping | 10% $HNO_3$ + 10% $H_2SO_4$ | 60 | 3 min. | 18.6 | 0.84 | 1.08 |
| IE15 | Dipping | 5% $HNO_3$ + 5% $H_2SO_4$ + 5% Oxalic acid | 55 | 3 min. | 19.1 | 0.89 | 1.06 |
| IE16 | Dipping | 10% $HNO_3$ + 5% $H_2SO_4$ + 5% Oxalic acid | 65 | 3 min. | 17.5 | 0.74 | 1.19 |
| IE17 | Dipping | 5% $HNO_3$ + 5% $H_2SO_4$ + 5% $H_2O_2$ | 60 | 3 min. | 18.3 | 0.87 | 1.16 |
| IE18 | Dipping | 10% $HNO_3$ + 5% $H_2SO_4$ + 5% $H_2O_2$ | 60 | 3 min. | 17.6 | 0.75 | 1.26 |
| IE19 | Dipping | 10% $HNO_3$ + 5% $H_2SO_4$ + 5% $H_2O_2$ | 60 | 1 min. | 18.6 | 0.84 | 1.18 |
| IE20 | EC Etching | 0.1N $H_2SO_4$ (0.2 V vs SHE) | 25 | 3 min. | 17.4 | 0.74 | 1.59 |
| IE21 | EC Etching | 0.05N $H_2SO_4$ (0.9 V vs SHE) | 25 | 30 sec. | 19.2 | 0.85 | 1.22 |
| CE8 | Dipping | 5% $HNO_3$ + 5% $H_2SO_4$ | 60 | 3 min. | 24.4 | 2.42 | 0.73 |
| CE9 | Dipping | 5% $HNO_3$ + 2% $H_2SO_4$ | 60 | 3 min. | 22.6 | 2.95 | 0.69 |
| CE10 | Dipping | 5% $HNO_3$ + 5% $H_2SO_4$ + 2% Oxalic acid | 60 | 3 min. | 24.7 | 2.06 | 0.81 |
| CE11 | Dipping | 5% $HNO_3$ + 5% $H_2SO_4$ + 2% $H_2O_2$ | 60 | 3 min. | 23.3 | 1.85 | 0.95 |
| CE12 | Dipping | Oxalic acid + $H_2O_2$ | 60 | 3 min. | 54.3 | 3.86 | 0.47 |
| CE13 | EC Etching | 0.01N $H_2SO_4$ (0.6 V vs SHE) | 25 | 30 sec. | 24.1 | 2.48 | 0.79 |
| CE14 | EC Etching | 0.01N $H_2SO_4$ (0.9 V vs SHE) | 25 | 30 sec. | 24.9 | 2.30 | 0.88 |

IE: Inventive Example,
CE: Comparative Example,
EC: Electrochemical,
CR: Contact Resistance,
CC: Corrosion Current Inventive Examples 1~9, and 12~19 were subjected to chemical etching, whereas Inventive Examples 10, 11, 20, and 21 were subjected to electrochemical etching.

Here, the physical properties of a general stainless steel separator are required to be a contact resistance of 20 mΩ·cm$^2$ or less and a corrosion resistance of 1 μA/cm$^2$ or less.

In comparison of Inventive Examples 1~6 with Comparative Examples 1 and 2, there is difference only in dipping time of the stainless steel sheet. That is, Comparative Examples 1 and 2 were etched for 10 seconds by dipping them into the same etching solutions as those of Inventive Examples 1~6. From the results shown in Table 2, it can be found that Comparative Examples 1 and 2 have higher contact resistance and corrosion current than those of Inventive Examples 1~6.

Therefore, it is desirable that the stainless steel sheet be dipped in the etching solution for 30 seconds or more in the case of chemical etching.

As can be seen from Inventive Examples 1 to 4, although an increase in dipping time from 30 seconds to 30 minutes leads to a decrease of the contact resistance, a decreasing degree of the contact resistance in relation to an extension of the dipping time slows down. Thus, it is desirable to determine a suitable treatment time under the conditions capable of fulfilling the required physical properties so as to simplify the process.

Inventive Examples 4 to 9 and 14 to 19, and Comparative Example 3 to 5 and 8 to 12 show results of etching stainless steel sheets with etching solutions obtained by mixing $HNO_3$, $H_2SO_4$, oxalic acid, $H_2O_2$, and other acid solutions in various manners as described above.

From the results, it can be seen that all of Inventive Examples 3 to 9 and 14 to 19 have contact resistances and corrosion resistances corresponding to the target values.

For Comparative Example 3 to 5 and 8 to 12, however, although each of the stainless steel sheets was dipped into an associated etching solution for 3 minutes or more, the contact resistance and the corrosion resistance were noticeably lower than the target values due to differences in processing conditions such as composition, concentration, and temperature of the etching solution.

When the concentration of the etching solution was too low or the treatment time was excessively shortened in the same composition, the effect of etching was not exhibited. Further, when the composition of the etching solution was different from the desired composition, the etching solution failed to selectively dissolve an iron oxide film on the stainless steel sheet, so that the physical properties of the stainless steel sheet could not be enhanced.

Therefore, it can be appreciated that the etching solutions and treatment conditions of Comparative Example 3 to 5 and 8 to 12 are not suitable for etching the passive film of the stainless steel separator for the fuel cell according to the present invention.

On the other hand, Inventive Examples 10, 11, 20 and 21, and Comparative Examples 6, 7, 13 and 14 show results of etching stainless steel sheets by an electrochemical etching process.

When comparing Inventive Examples 10, 11, 20 and 21 with Comparative Examples 13 and 14, it can be appreciated that electrochemical etching only for 30 seconds leads to satisfactory contact resistance and corrosion resistance of the stainless steel sheet, and that the contact resistance and the corrosion resistance can be changed by the normality of sulfuric acid.

In other words, it can be appreciated that a concentration of sulfuric acid of 0.01N or less results in non-satisfactory contact resistance and corrosion resistance.

Further, when comparing Inventive Examples 10, 11, 20 and 21 with Comparative Examples 9, 10, 13 and 14, it can be appreciated that electrochemical etching at 0.6 V and 1.2 V leads to higher contact resistance and corrosion resistance of the stainless steel separator for the fuel cell than at 0.2 V and 0.9 V.

Referring to FIG. 5, when potentials of I and III regions are applied to the etching solution, $Fe_2O_3$ and $FeO_3$ can be selectively removed.

On the other hand, since $Cr_2O_3$ is also dissolved at potentials of II and IV regions, it is difficult to selectively lower the content of Fe in II and IV regions. Thus, it is preferable that the potentials of I and III regions are applied to the etching solution.

Generally, when manufacturing a fuel cell system, a plurality of stainless steel separators for a fuel cell are stacked to produce a fuel cell stack, and it is difficult to replace the stainless steel separators with new ones after the fuel cell system is operated.

Therefore, it is necessary for the stainless steel separator for the fuel cell to have reliability such that the contact resistance and the corrosion current do not significantly increase even after long-term operation of the fuel cell system.

Evaluation of long-term performance of the stainless steel separator was performed under conditions of a hydrogen/air relative humidity of 100%/100%, an operating temperature of 70° C., and a stoichiometric ratio of hydrogen to air of 1.5/2.0.

For the evaluation of long-term performance, after coupling the fuel cell to a performance tester, the fuel cell was activated to exhibit the maximum performance at an initial stage. Then, an initial performance of the cell was measured by a current-voltage curve (I-V curve) measuring method, and, contact resistance and interior resistance of the cell were measured by impedance measurement.

Further, prior to the evaluation of long-term performance, the initial performance and state of the fuel cell was confirmed through measurement of an actual area by an electrochemical reaction via Pt catalysis using a cyclic voltammetry (CV) method. Then, durability reduction of the fuel cell for a predetermined period was measured by a method of evaluating performance through application of a constant current density of 1 $A/cm^2$.

Further, metal ions water discharged during durability evaluation was examined with ICP-MS (inductively coupled plasma mass spectroscopy: an inductively coupled plasma-based analyzer capable of analyzing components of the specimen in a more accurate range than existing ICP analyzers, through analysis of the specimen using a mass spectroscopy) to measure elution of metal ions.

Further, after an elapse of a predetermined period of time, a performance reduction rate of the fuel cell can be analyzed through measurement of the performance and state of the fuel cell with the same method as that for confirming the performance and state of the fuel cell at the initial stage.

Figure 8:
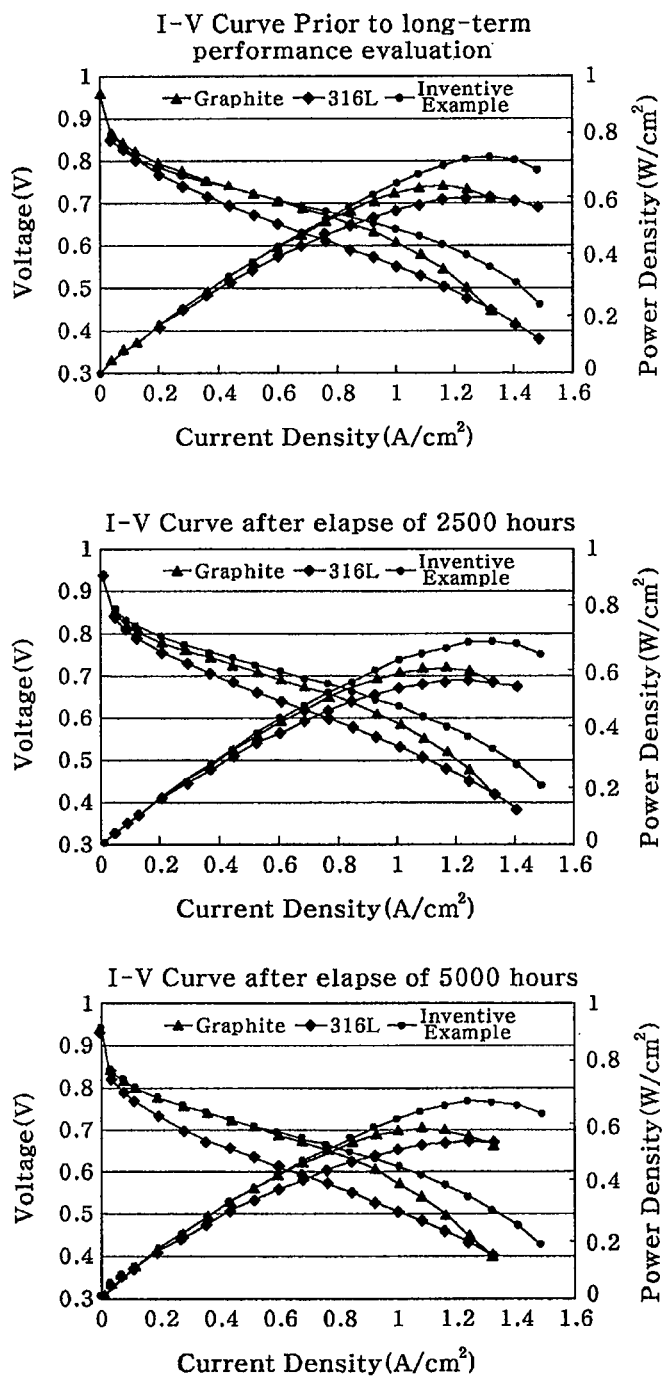
FIG. 8 is a graph representing results of long-term performance evaluation of a fuel cell including the stainless steel separator manufactured by the method according to the present invention.

FIG. 8 is a graph representing results of long-term performance evaluation of a fuel cell including the stainless steel separator manufactured by the method according to the present invention. At first, I-V curves prior to long-term performance evaluation of a graphite separator, a SUS316L separator, and a stainless steel separator manufactured according to one embodiment of the invention will be described.

In order to have propriety as a separator for a fuel cell, a stainless steel separator is required to have a voltage of 0.6 V or more with application of a constant current density of 1 $A/cm^2$. For an initial performance of a fuel cell prior to the long-term performance evaluation, although both the graphite separator and the stainless steel separator for the fuel cell according to the invention fulfill the requirement of 0.6 V or more with application of the constant current density, the stainless steel separator of the invention has a higher voltage than the graphite separator.

Further, from I-V curves after an elapse of 2500 hours, it can be appreciated that the stainless steel separator of the invention still has a voltage of 0.6 V or more, whereas the graphite separator and the SUS316L separator have voltage below 0.6 V.

Further, from I-V curves after an elapse of 5000 hours, it can be appreciated that the graphite separator and the SUS316L separator have voltage below 0.6 V, whereas the stainless steel separator of the invention still has a voltage of 0.6 V or more with application of the constant current density.

This is because Fe, Cr and Ni contained in the passive film of the stainless steel sheet is oxidized to compounds having low reactivity and high stability by etching the stainless steel sheet, so that these metal components are ionized and prevented from being eluted during operation of the fuel cell.

Further, although the stainless steel separator of the invention is subjected only to the etching without surface coating, it has a small elution amount of metal ions such as Fe, Cr, Ni and the like, so an electrolyte membrane of the fuel cell is prevented from being contaminated by the eluted metal ions, whereby the performance of the fuel cell is prevented from being degraded even after long-term operation.

In practice, according to a result of ICP-MS analysis with respect to discharged water, a product from the fuel cell operated for 5000 hours under the condition of applying the constant current density, a total amount of eluted metal ions from the etched stainless steel separator is 300 ppb or less, which is noticeably lower than 760 ppb, a total amount of eluted metal ions from the stainless steel sheet before etching.

Conventionally, Fe and Ni ions are eluted from the separator and contaminate the electrolyte membrane during operation of the fuel cell. However, the stainless steel separator for the fuel cell according to the present invention has a smaller elution amount compared to a non-treated material for the separator even after long-term operation of the fuel cell, and does not experience a significant increase in contact resistance. Therefore, it can be expected that the stainless steel separator of the invention can improve the performance of the fuel cell.

The invention claimed is:

1. A method for surface treatment of a stainless steel separator for a fuel cell, comprising:
preparing a stainless steel sheet containing nickel, chrome and iron, and having a passive film on a surface of the stainless steel sheet; and
dipping the stainless steel sheet into an etching solution formed by mixing one of oxalic acid ($C_2H_2O_4$) and hydrogen peroxide ($H_2O_2$) with a solution of nitric acid ($HNO_3$) and sulfuric acid ($H_2SO_4$) prepared as a basic solution at a temperature of 50~70° C. for 30 seconds to 30 minutes to selectively lower the amount of Fe in the passive film formed on the surface of the stainless steel sheet,
wherein the stainless steel separator has a contact resistance of 20 mΩ·$cm^2$ or less and corrosion current of 1 μA/$cm^2$ or less
wherein the etching solution comprises 5~20 wt % pure nitric acid, 2~15 wt % pure sulfuric acid, 0.5~10 wt % pure oxalic acid or pure hydrogen peroxide, and a balance of water.

2. The method according to claim 1, wherein the dipping step is performed for 30 seconds to 10 minutes to shorten a processing time.

3. The method according to claim 1, wherein the stainless steel sheet comprises 0.08 wt % carbon (C), 16~28 wt % chrome (Cr), 0.1~20 wt % nickel (Ni), 0.1~6 wt % molybdenum (Mo), 0.1~5 wt % tungsten (W), 0.1~2 wt % tin (Sn), 0.1~2 wt % copper, and the balance of iron (Fe) and other unavoidable impurities.

4. The method according to claim 1, wherein the passive film having the lowered amount of Fe has a condition of (Cr+Ni)/Fe≥1 in terms of atomic weight.

5. The method according to claim 1, wherein the passive film having the lowered amount of Fe comprises 20~75 wt % Cr.

6. The method according to claim 1, wherein the passive film having the lowered amount of Fe comprises 30 wt % or less Fe.

* * * * *